United States Patent Office 3,330,853
Patented July 11, 1967

3,330,853
TETRACYANOETHYLENE SYNTHESIS
John E. Harris, Hyde Park, Mass., assignor to Monsanto Research Corporation, St. Louis, Mo., a corporation of Delaware
No Drawing. Filed Aug. 7, 1964, Ser. No. 388,307
5 Claims. (Cl. 260—465.8)

This invention relates to a method for the synthesis of an organic compound, and more particularly, to a method for the synthesis of tetracyanoethylene.

One established method for the synthesis of tetracyanoethylene consists of reacting a metal with a dihalomalononitrile. The reaction involves the removal of both halogen atoms from each of two molecules of the dihalomalononitrile, with combination of the residues to form tetracyanoethylene, as illustrated by the equation

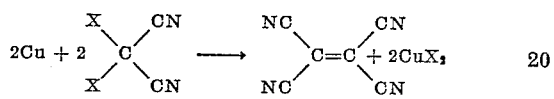

where X is a halogen atom. Usually the halogen is bromine, which is one of the more expensive halogens, and as will be seen from the above equation, the reaction consumes 4 atoms of bromine per molecule of tetracyanoethylene made.

In accordance with this invention, it has now been found that tetracyanoethylene is produced by contacting a monohalomalononitrile with an organic sulfide. The reaction proceeds by removal of a hydrogen halide from the halomalononitrile, as illustrated by the equation

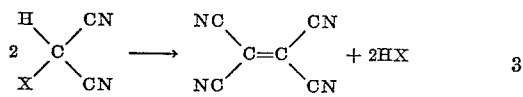

In general, both mono- and dihalomalononitriles are made by halogenation of malononitrile. Since the present method involves the consumption of only half as much halogen as the above-described reaction of a dihalomalononitrile with a metal, it will be evident that the presently provided process will be more economical, and thus advantageous.

In conducting the present method, the halomalononitrile employed may be one with a halogen substituent having an atomic weight of from 30 to 130, which includes chlorine, bromine and iodine. Bromine is the preferred substituent.

A wide variety of organic sulfides can be employed in conducting the present process. The useful sulfides are sulfides containing up to two thio sulfur atoms joined to hydrocarbon radicals free of aliphatic (non-benzenoid) unsaturation. They may be represented by the formula $R_1-(S-R_2)_n$, where $R_1$ and $R_2$ are hydrocarbon radicals free of aliphatic unsaturation, which may be the same or different, and $n$ is 1 or 2. Exemplary of these sulfides are, for example aliphatic straight-chain and cyclic sulfides such as dimethyl sulfide, diethyl sulfide, ethyl n-propyl sulfide, n-butyl ethyl sulfide, di-n-propyl sulfide, di-t-butyl sulfide, dicyclohexyl sulfide, propylene sulfide, tetrahydrothiophene, pentamethylene sulfide and the like; aliphatic disulfides such as bis(ethylthio)-methane, bis(isopropylthio)methane, 1,2-bis(ethylthio)-ethane and the like; and aryl sulfides (compounds including as aromatic ring) such as diphenyl sulfide, phenyl methyl sulfide, phenyl ethyl sulfide, phenyl n-propyl sulfide, phenyl isopropyl sulfide, phenyl t-butyl sulfide, butyl m-tolyl sulfide, phenethyl ethyl sulfide, benzyl phenyl sulfide, dibenzyl sulfide, bis(phenylthio)methane, and so forth. The aryl sulfides are preferred, and the diaryl sulfides, particularly those in which aromatic ring carbon atoms are joined to the sulfide sulfur atom, are especially preferred. The hydrocarbon radicals of the sulfide may contain, say, up to 12 carbon atoms.

The halomalononitrile is preferably contacted with the organic sulfide in an inert liquid reaction medium. Suitable solvents and diluents for use as tthe reaction medium are organic liquids such as hydrocarbons like toluene, xylene or the like, and ethers such as the dimethyl ether of ethylene glycol, the diethyl ether of ethylene glycol, the dimethyl ether of diethylene glycol, tetrahydrofuran, and the like.

The ratio of the halomalononitrile to the organic sulfide may vary. The mechanism of the reaction by which tetracyanoethylene is formed in accordance with the present process may involve the transient formation of an adduct between the organic sulfide and the halomalononitrile such as a sulfonium salt:

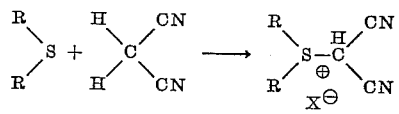

(X=halogen, R is a hydrocarbon radical) followed by release of dicyanocarbene radicals

which subsequently dimerize. Since the sulfide would not combine with the hydrogen halide displaced from the halomalononitrile molecule, this mechanism would permit a cyclic process, in which the same sulfide molecule is used and re-used. However, in any case it appears desirable to use more than a catalytic amount of the sulfide, and indeed, to have the sulfide present in a molar ratio to the halomalononitrile of at least above 1:10. Higher ratios, such as up to a 1:1 molar ratio or greater may be used, and indeed, an excess of the sulfide such as up to a 5:1 molar ratio to the halomalononitrile may be used if desired. Good yields are obtained in the range of from a 4:5 to a 5:4 molar ratio of the sulfide to the halomalononitrile, and this range is especially preferred.

To conduct the reaction, the halomalononitrile is contacted with the organic sulfide, preferably in a liquid reaction medium, as above stated. The temperatures of the reaction mixture may range from 25° to 125° C., for example, and lower and higher temperatures are operable, with suitably adjusted reaction times. Reaction is moderately rapid in the range of 75–100° C., while changing the temperature will vary tthe reaction rate accordingly. An inert atmosphere is preferably maintained above the surface of the reaction mixture, to avoid hydrolysis of the moisture-sensitive product; this may, for example, be nitrogen, argon or the like. Atmospheric pressure is suitable, though pressures as low as, say, about 0.5 mm. Hg or as high as 5000 pounds per square inch may be used if desired. Reaction times will vary with variation in conditions such as pressure and temperature. Batch processes may be used or a continuous process can be applied to operation of the present method. The tetracyanoethylene product is isolated by suitable means such as sublimation, extraction, precipitation and the like.

The invention is illustrated but not limited by the following example.

Example

A solution of 14.5 grams (0.1 mole) of monobromomalononitrile in 25 milliliters (ml.) of dimethoxyethane is added drop-by-drop to a refluxing (80–85° C.) mixture of 18.6 grams (0.1 mole) diphenyl sulfide and 35 ml. of dimethoxyethane, under nitrogen. The reaction mixture is then refluxed for two hours, after which the dimethoxyethane solvent is evaporated off. Hexane is added to the residue, producing formation of a precipitate which is filtered off and dried. The solid precipitate, M. 194°, is tetracyanoethylene; the identification is confirmed by the infrared spectrum. Diphenyl sulfide is recovered from the filtrate.

While the invention is described with particular reference to specific preferred embodiments thereof, it will be appreciated that modifications and variations can be made without departing from the scope of the invention as disclosed herein, which is limited only as indicated in the following claims.

What is claimed is:

1. A method for producing tetracyanoethylene which comprises contacting a monohalomalononitrile having the formula $XCH(CN)_2$ wherein X is a halogen with an atomic weight of between 30 and 130 with an organic sulfide of the formula $R_1-(S-R_2)_n$ wherein $R_1$ and $R_2$ are hydrocarbon radicals free of aliphatic unsaturation and containing up to about 12 carbon atoms and $n$ is 1 or 2, in an inert organic liquid reaction medium.

2. The method of claim 1 in which said monohalomalononitrile is bromomalononitrile.

3. The method of claim 1 in which said organic sulfide is a diaryl sulfide having aromatic ring carbon atoms joined to the sulfide sulfur atom.

4. The method of claim 1 wherein said monohalomalononitrile is bromomalononitrile and said organic sulfide is diphenyl sulfide.

5. The method of claim 1 wherein said monohalonitrile and said sulfide are contacted at a temperature between about 25° C. to about 125° C. and the ratio of said sulfide to said monohalomalononitrile is from about 1:10 to about 5:1.

No references cited.

CHARLES B. PARKER, *Primary Examiner.*
JOSEPH P. BRUST, *Examiner.*